April 17, 1945.  K. H. HACHMUTH  2,373,888
APPARATUS FOR CONDUCTING CATALYTIC REACTIONS
Original Filed May 7, 1940
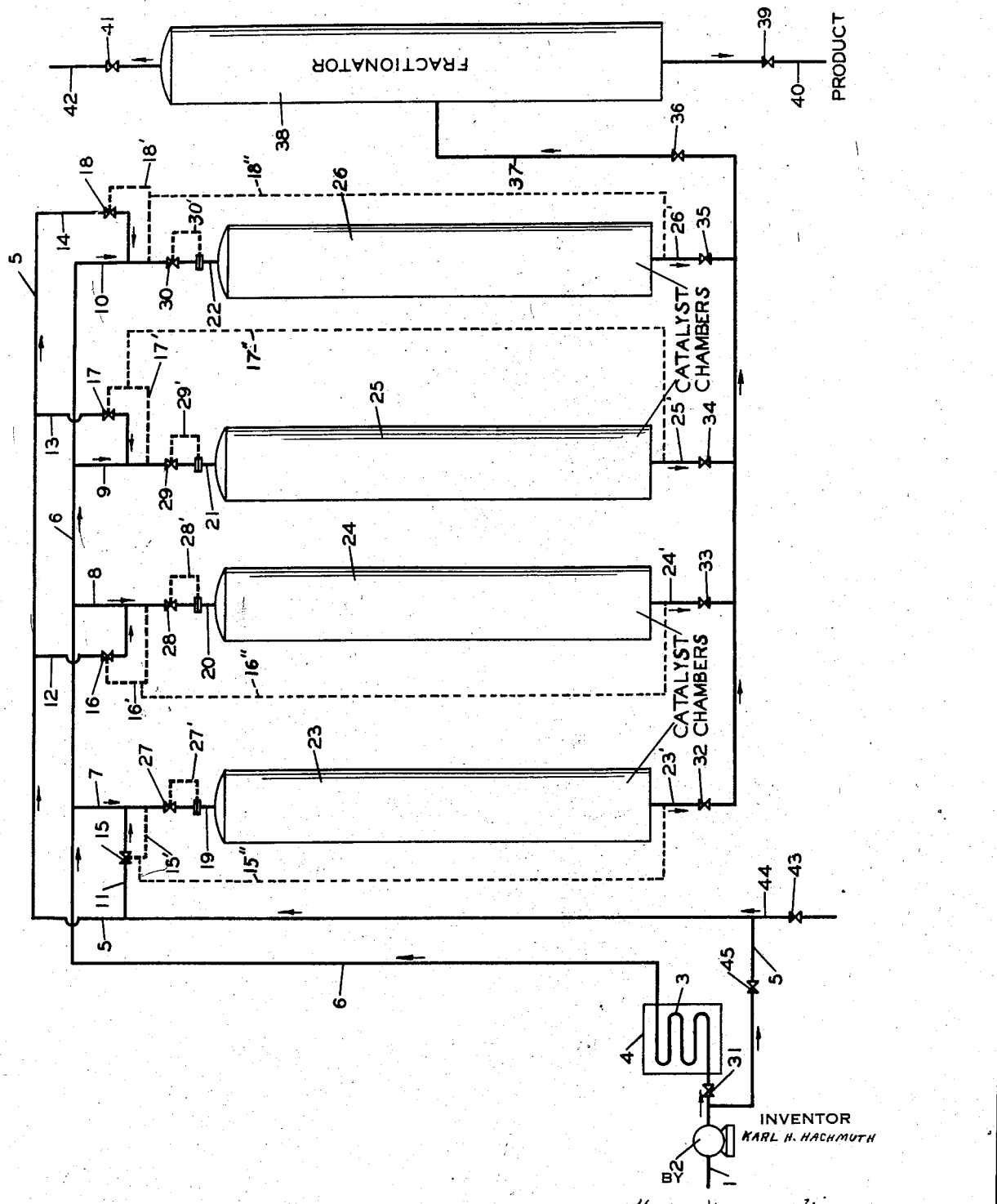
INVENTOR
KARL H. HACHMUTH
BY
Hudson, Young and Yingez
ATTORNEY Patented Apr. 17, 1945

2,373,888

UNITED STATES PATENT OFFICE 2,373,888

APPARATUS FOR CONDUCTING CATALYTIC REACTIONS

Karl H. Hachmuth, Bartlesville, Okla., assignor to Phillips Petroleum Company, a corporation of Delaware Original application May 7, 1940, Serial No. 333,872. Divided and this application March 10, 1942, Serial No. 434,126

12 Claims. (Cl. 23—288)

This invention relates to the conducting of catalytic reactions and more particularly to the conducting of a catalytic reaction within an elevated temperature range with two or more portions of a catalyst that are used in parallel and that differ in activity.

In the conducting of a catalytic reaction to obtain a profitable rate of reaction with a given body of catalyst, the operating conditions generally must be progressively changed to compensate for decrease in catalytic activity as the catalyst gradually becomes deactivated. Usually the most convenient compensatory change is a gradual increase in the reaction temperature. Finally, however, the catalyst is so fully deactivated that any further increase in temperature is unprofitable or is otherwise undesirable. At this point the catalyst is replaced, or it is revivified by a procedure that removes the deactivating material deposited on it during use. When only one portion of catalyst is used at a time, the replacement or the revivification causes an undesirable interruption of the catalytic reaction; for this reason, two or more portions of catalysts, generally within individual catalyst chambers, are preferably used. These portions become fully deactivated one by one in turn, at approximately equal intervals of time, and each is replaced by fresh or revivified catalyst without interrupting the conversion occurring in the other portions. During use of such a multiplicity of portions of catalyst, the catalytic reaction or conversion must be effected at different temperatures in the various portions, in accordance with the different degrees of catalytic activity, in order that each portion may effect its share of the aggregate conversion.

In the past, the different temperatures required in the various portions of catalyst have been obtained by separately heating each portion or body of catalyst, or the stream of reactant material coming into contact therewith, to the proper temperature; this system entails the use of a separate heating unit for each portion of catalyst, and each unit must be continuously adjusted to provide the temperature required at the moment. Such a system of a multiplicity of heating units, which may be separate sections of a common heater or individual heaters, one for each portion of catalyst, suffers from the disadvantages of complexity both in the amount of the heating equipment and in its operation.

In one modification, the present invention comprises the steps of dividing a stream of material, which is to undergo a catalytic reaction, into at least two substreams; heating one of the substreams to at least about the maximum temperature at which the reaction is to be effected, any effect of the reaction itself upon the temperature being disregarded, or to about the maximum temperature desired for the charge stock for the reaction; and forming from the hot substream and the cooler substream a multiplicity of reactant streams equal in number to a multiplicity of portions or bodies of a catalyst that are used simultaneously in separate catalyst zones for effecting said catalytic reaction, each of said reactant streams being formed of such proportions of the heated and the unheated substreams that the temperature of the resultant stream corresponds to the instantaneous degree of activity of the body of catalyst with which it is to be in contact, in such a way that each of the reactant streams undergoes a predetermined degree of conversion during its period of contact with the catalyst.

One of the objects of the invention is to provide a process of obtaining different reaction temperatures in two or more separate catalytic reaction zones, arranged in parallel and provided with portions of catalyst or with different catalysts for the same reaction, that differ in activity, in such a manner that each zone or portion effects a predetermined share of the aggregate conversion.

Another object is to effect by means of a single heating unit, the establishment of different temperatures in two or more parallel streams of reactant material that subsequently pass into contact with separate portions of a catalyst that have different instantaneous degrees of catalytic activity.

Still another object of the invention is to use a single heating unit to provide a heat-carrying material to two or more reaction zones which are maintained at different temperatures.

A further object of my invention is to obtain, from a single charge stream and a single heating unit, two or more charge streams of different and independently variable temperatures.

Another object of the invention is to provide a means for continuously blending two separate streams to form a composite stream with desired characteristics.

Other objects and advantages of the invention will be obvious to those skilled in the art.

The invention may be used for the conduction of any process which involves a catalytic reaction that requires a temperature differing from atmospheric temperature and it may be used in connection with either an endothermic or an exothermic reaction. Although the invention will generally be practiced in connection with reactions at elevated temperatures, it may be readily applied to reactions carried out at low temperatures by cooling one of the substreams. It is especially valuable for conducting catalytic reactions involving hydrocarbons either as reactants or as products, such as hydrogenation, dehydrogenation, polymerization, depolymerization, alkylation, cracking, desulfurization, oxidation, hydration, dehydration (such as of alcohols to olefins), and the like; but it may be used also for conducting catalytic reactions in which hydrocarbons are not involved.

Numerous methods may be employed for blending portions of the hot and of cooler substreams to form a charge stream having a desired temperature for any particular catalyst chamber. In a modification which may be often used, branch pipes, each controlled by an individual valve, are led from a hot-stream manifold and a cold-stream manifold, respectively, one branch from each manifold comprising the feed to a catalyst chamber. If desired, the valves on each such branch may be so interconnected, or otherwise controlled, that as one is opened the other is closed and the composite stream can thus readily be varied as to temperature without appreciable variation in total volume, when a substantially constant total volume is to be used. However, I have found that flow control valves do not generally operate entirely trouble-free on hot streams, and have developed other and novel means for controlling the streams. In such a novel modification, the rate of flow of the composite stream is controlled or limited by suitable flow control means, or is maintained at the maximum capacity of the pipe or conduit through which it flows, and a flow-control valve on the cooler stream is actuated by a temperature responsive device, no control valve being used on the hot stream. The flow of the hot stream is thus controlled indirectly, without the direct use of a separate valve, by the cooperation of the actions of the limitation of flow of the composite stream and the flow control of the cooler stream.

Solely for the sake of simplicity, it being understood that the invention is not to be limited thereby, an application of my invention will be described in connection with the conduction of the polymerization and olefins at elevated temperatures, such as the polymerization of normally gaseous olefins to gasoline-range hydrocarbons.

The accompanying drawing is a flow-diagram illustrating diagrammatically a specific embodiment of the invention as applied to such a polymerization. Substantially the same arrangement can be used in a dehydrogenation process, or the like.

The feed, comprising polymerizable olefins, enters the system through inlet 1 and pump 2, which maintains it at any desired pressure. It is divided into two substreams, one of which is heated to a desired temperature in heating coil 3 in heater 4, and the other of which passes unheated, or only partially heated, through conduit 5. The temperature to which the first substream is heated generally is at least as high as the maximum temperature desired for the charge stock to the polymerization step in the presence of the least active catalyst body that is to be used in the subsequent polymerization chambers; in addition, the temperature should be high enough to compensate for any heat loss occurring prior to the polymerization. A temperature of about 450 to 600° F. is suitable for most purposes, but it may be higher or lower than this value in particular instances. The temperature is preferably maintained at a substantially constant level by means of an automatic temperature controller, not shown, that regulates the input of heat or of fuel to heater 4.

Although generally coil 3 is so constructed that the pressure drop in it and conduit 6, taken together, is greater than that in conduit 5, at times it may be desirable to increase the resistance to flow of the heated substream. Such an increase may be readily effected by constricting this substream, as by control-valve 31 or by a constriction in conduit 6.

The hot substream passes from heater 4 through conduit and manifold 6, from which lead branch pipes 7, 8, 9, 10. The cooler substream passes through valve 45 and conduit and manifold 5, from which lead branch pipes 11, 12, 13, and 14. Branch pipes 7, 8, 9, and 10 are joined to 11, 12, 13, and 14, respectively, and from their junctures pipes 19, 20, 21, and 22 lead to catalyst chambers 23, 24, 25, and 26, respectively. The rates of flow through pipes 19, 20, 21, and 22 are preferably controlled by flow-control valves 27, 28, 29, and 30, respectively, and are generally held substantially constant for long periods of time. This flow control is adapted to set a maximum on the total flow, more than sufficient material being available to supply this maximum. In some instances the capacity of any one of the pipes 19 to 22 may be a sufficient limit and maximum, so that no additional control is necessary. In most cases, however, it will be desirable at times not to reach the capacity of the pipe carrying the combined streams as a maximum and for this reason some sort of flow-control, as shown, will be used. These flow-control valves may be manually or otherwise operated, as desired, but very satisfactory operation is obtained by having them automatically controlled through the agency of means actuated by an orifice flow meter, or other type of flow meter, represented by 27', 28', 29', and 30', respectively, and which may be on either the upstream or downstream side with respect to valves 27, 28, 29, and 30, respectively, the former arrangement being preferred. The individual regulating means may all be set to the same flow rate, or to different flow rates, as individual circumstances may indicate is desirable or necessary. The temperatures of the composite streams flowing through each of the pipes 19, 20, and 21 and 22 are regulated by flow-control valves 15, 16, 17, and 18 in branch pipes 11, 12, 13, and 14, respectively, which convey the cooler material. These valves may be manually or otherwise operated, as desired, but I have obtained good performance by having them actuated by temperature responsive devices or means which respond to the temperatures of the composite streams in conduits 19, 20, 21, and 22, as represented by 15', 16', 17' and 18', respectively. With this arrangement, a slight positive differential is maintained in manifold 5 over that in manifold 6, thereby insuring a positive flow through the control valves 15, 16, 17, and 18 at all times. The temperature responsive devices should be placed at a sufficient distance from the union of the hot and cooler streams to result in accurate control, such as at a sufficient distance to insure effective mixing of the streams. Other means for accomplishing the same result may be used, but for most applications this arrangement is the simplest. A number of automatic controllers, or similar means, are available commercially, and can be readily adapted by one skilled in the art. Such may be set to any desired temperature or temperatures for the composite streams, and will then operate the flow control valves 15 to 18 to maintain such temperatures. Such temperature values may be changed from time to time as desired, either by hand or automatically, as referred to hereinafter.

In catalyst chambers 23, 24, 25, and 26 polymerization of olefins to heavier hydrocarbons is effected in the presence of a polymerization catalyst. Each catalyst chamber generally contains a different portion or body of the same catalytic material, and in general at any particular moment the different bodies of catalyst have different degrees of activity and hence require different temperatures, all other conditions being the same, to effect substantially the same predetermined extent of polymerization. With this particular modification these different temperatures are obtained by suitable control of valves 15, 16, 17, and 18. As the catalyst body in any particular catalyst chamber becomes progressively deactivated, the temperature of the incoming reactant stream must be correspondingly increased to effect the same extent of conversion. This increase may be effected by a manual setting of the corresponding automatic controller actuating the appropriate valve of the group 15, 16, 17, or 18 so that less unheated material passes through the valve controlled by the automatic controller. Alternatively, the setting of such an automatic controller may be changed by a secondary automatic controller that is responsive, directly or indirectly, to the extent of polymerization effected by the corresponding catalyst body; that is, the secondary controller (illustrated as 15'', 16'', 17'', and 18'') being actuated by some characteristic of the effluent streams in the appropriate conduit 23', 24', 25', or 26', respectively, leading from one of the catalyst chambers 23, 24, 25, or 26, and so setting or controlling the primary controller 15', 16', 17', or 18' that the temperature of the reactant stream is adjusted to that required to effect a definite predetermined degree or extent of polymerization. For example, the secondary controller may be made responsive to the change in composition of the effluent stream that leaves the catalyst chamber, or to the change in temperature that takes place between inlet and effluent streams as a result of the polymerization, which is an exothermic reaction. Since sufficient material is available to maintain the maximum flow through any one of the pipes 19 to 22 at all times, a decrease in the cooler stream automatically results in a rise in temperature of the composite stream without changing the total flow rate, and the converse is also readily obtained.

Although no restriction as to the size of the various portions or bodies of catalyst, or of the various reactant streams, is necessary for the operation of the invention, it is generally preferred to use portions of substantially equal size and to make the reactant streams also substantially equal in size. However, at times the reactant streams may be advantageously made different in size; thus if one or more of the catalyst bodies is different from the rest as to size, a corresponding difference may be maintained for the reactant stream, or one or more of the streams may be made relatively disproportionate to the size of the portion of catalyst with which it comes into contact if catalyst bodies of equal size are used. For example, at times improved results may be obtained with a relatively less active, or a relatively deactivated catalyst portion by a rate of flow lower than that used for the other catalyst portions. Such a relatively low rate tends to decrease the temperature required, to increase the quality of the product, and to prolong the period of use of the catalyst portion by decreasing its rate of deactivation. Conversely, if it is desired to hasten the deactivation of a particular catalyst portion, in order that its removal from the process upon deactivation shall occur at the predetermined time, the rate of flow may be made relatively large.

Regardless of the requirements in any particular case, the preferred arrangement of control valves shown is so flexible that they can be met. By its use, individual operation of each catalyst chamber in any desired manner can be obtained within broad limits of pressure, temperature, and rate of flow, independently of the manner of operation of the other catalyst chambers, and any chamber may be removed from the system or other chambers may be introduced as will be appreciated.

After the polymerization has been effected in catalyst chambers 23, 24, 25, and 26, the various streams of products pass through gate valves 32, 33, 34, and 35, respectively, and are combined. The resulting composite effluent stream passes through control valve 36, which serves as a pressure reduction valve, and conduit 37 to fractionator 38, in which fractionation is effected into at least two fractions, such as a fraction containing the desired polymer product, which may be withdrawn from the system through valve 39 and outlet 40, and relatively light or unreacted hydrocarbons, which may be withdrawn through valve 41 and outlet 42, and which may be treated in whole or in part to increase the concentration of olefins, as by dehydrogenation, and then reprocessed.

Although the substream 5 has been primarily described as an unheated stream, it may be heated to a certain extent, preferably not above the minimum temperature desired for any particular reactant stream. This partial heating may be accomplished by any desirable or available means, as by indirect heat exchange with the catalyst effluent or by heat exchange in the economizer section of a furnace, thereby utilizing waste heat and reducing the heat input of heater 4. In case two separate streams are available, one may be heated as discussed and the other introduced in an unheated condition through pipe 44, with valve 45 in pipe 5 partially or completely closed, as may be desired. In a catalytic cracking or dehydrogenation process, for example, the heated stream may comprise recycled unreacted material while the unheated stream may comprise fresh charge stock. The hot stream may be subjected to control rather than the cooler one, although such an arrangement ordinarily will not be desirable, except with sub-atmospheric operations.

The following examples are given purely for the purpose of illustrating a few of the many possible modes of operation of the invention; they are not to be taken as establishing any limitations of the invention.

Example I

A feed having the following mol-percentage composition was used as charge to a catalytic polymerization operation:

| | |
|---|---:|
| Ethylene | 0.48 |
| Ethane | 0.28 |
| Propylene | 11.82 |
| Propane | 6.51 |
| Butylenes | 13.11 |
| Butanes | 67.18 |
| Heavier | 0.62 |
| | 100.00 |

This feed was pumped to a pressure somewhat exceeding 1500 pounds per square inch; its temperature was about 100° F. Part of the feed stream was heated to a temperature of about 600° F. in a tube coil heated by the burning of fuel gas. The temperature of the heated stream was maintained substantially constant by an automatic controller that regulated the amount of fuel gas being burned. Passage of this part of the feed stream through the tube coil caused its pressure to decrease to about 1500 pounds per square inch. The other part of the feed stream was not heated.

Four catalyst chambers of equal size were used, all containing substantially equal amounts of a solid, granular silica-alumina polymerization catalyst comprising alumina absorbed on silica gel similar to that described in McKinney, Patent No. 2,142,324. However, only three of the chambers were used at a time, the fourth being ready to be used in its turn upon deactivation of one of the three. That is, the fourth chamber was conditioned for use during operation of the other three, as by revivification of spent catalyst or by replacement of spent catalyst with fresh catalyst, and was put into operation when a chamber containing deactivated catalyst was withdrawn from operation.

Because, at any particular moment, the bodies of catalyst in the three catalyst chambers in simultaneous use had been in service for different periods, they had different degrees of activity and therefore required different temperatures to effect the same extent of polymerization. At first, when fresh, a portion of catalyst required a temperature of about 220° F. in the incoming reactant stream in order to effect polymerization to the extent that the normally gaseous hydrocarbons in the effluent from the catalyst chamber had a mol-percentage composition approximately as follows:

| | |
|---|---:|
| Ethylene | 0.60 |
| Ethane | 0.35 |
| Propylene | 5.53 |
| Propane | 8.11 |
| Butylenes | 1.63 |
| Butanes | 83.78 |
| | 100.00 |

The extent of polymerization was 18.8 per cent by weight of the feed. As each catalyst body underwent progressive deactivation, the temperature had to be correspondingly increased, in order for the extent of polymerization to be maintained. Finally, when the temperature of the incoming reactant stream reached 450° F., the body of catalyst was considered sufficiently deactivated to be removed from service and replaced by a fresh or a revivified body of catalyst. The catalyst used was capable of polymerizing at a satisfactory rate up to a temperature of about 600° F., but the proportion of polymers heavier than the dimer in the product tended to increase at temperatures above about 450° F., which was undesirable for the present operation.

The catalyst chambers were not heated otherwise than by the reactant streams. The chambers were insulated against excessive heat loss; what heat loss occurred was more than compensated by exothermic heat of polymerization, which in addition caused the temperature of the effluent to be about 30 to 90° F. above that of the incoming reactant stream.

Each of the three reactant streams going into the three catalyst chambers in simultaneous use was formed from both the feed stream heated to about 600° F. and the unheated feed stream at about 100° F. An automatic controller, actuated by a thermocouple located in the reactant stream at the inlet of the catalyst chamber, adjusted a valve controlling the addition of the unheated material to the heated material going to the chamber; that is, this controller so increased or decreased the cold feed to the chamber that the temperature of the composite, reactant stream was substantially constant at the value necessary at the moment for the desired extent of polymerization to be effected. From time to time, as the catalyst progressively became deactivated, the setting of the controller was manually changed, so that the temperature of the reacting stream was correspondingly increased and the extent of polymerization was maintained at substantially the same level until finally the body of catalyst was so deactivated as to require replacement or revivification.

An automatic flow controller, actuated by an orifice flow meter through which the reactant stream passed just before reaching the catalyst chamber, controlled the rate of flow of the composite reactant stream by automatically adjusting a flow-control valve, through which the composite reactant stream passed, in such a way as to compensate for fluctuations in the pressure and in the back pressure developed in the catalyst chamber.

The extent of polymerization in each individual catalyst chamber was followed by weathering 100-cc. samples of the effluent, withdrawn from the outlet of the chamber through a small cooling coil immersed in an ice bath. After the weathering, which took place at atmospheric pressure, the amount of residue remaining at 100° F. indicated qualitatively the extent of polymerization, and the temperatures in the individual chambers were adjusted until all gave the same amount of residue. Periodic determinations of the butylene content of the effluent indicated quantitatively the thoroughness of the polymerization. If too much butylene was present in the effluent, the temperatures in all three chambers were increased; later, small adjustments were made individually to bring the chambers back into line with one another.

Partly because of the excellent temperature control effected by the operation of the invention as given in the foregoing example, each body of catalyst effected the production of more than 500 times its own volume of polymer gasoline, principally heptenes and octenes, before the inlet temperature reached 450° F.

*Example II*

In another polymerization process a total of five catalyst chambers were used, four being onstream at a time. The unheated feed stream was at a pressure of about 1540 pounds per square inch and a temperature of about 100° F.; the heated feed stream was at a pressure of about 1500 pounds per square inch and a temperature of about 500° F. As in Example I, a granular silica-alumina catalyst was used. The change effected by the polymerization is indicated by the following composition of the feed stream and of the effluent from the catalyst chambers, in percentages by weight:

| Component | Feed stream | Effluent stream |
| --- | --- | --- |
| Propylene | 3.07 | 3.39 |
| Propane | 11.38 | 12.55 |
| Butylenes | 18.75 | 2.07 |
| Butanes | 66.80 | 73.52 |
| Polymer | 0.00 | 8.47 |
|  | 100.00 | 100.00 |

In this sample, the temperature and the rate of flow of each of the four reactant streams were controlled and adjusted substantially in the manner described in Example I.

Although in the foregoing two examples the operating pressure was about 1500 pounds per square inch, it will be recognized by those skilled in the art that pressures above and below this value can be used in the polymerization processes described. As is well known, almost any pressure can be used in a catalytic polymerization process, but high pressures within the range of 500 to 2000 pounds per square inch are preferred to low pressures on thermodynamical grounds and on the grounds of efficient handling of materials.

The use of a plurality of catalyst chambers having catalyst portions of different instantaneous degrees of activity, and the use of different temperatures obtained in the manner described, results in an evening-out of the heat load on the fractionating system that fractionates the effluent from the catalyst chambers. This advantage becomes the greater, the larger the number of catalyst chambers; for, with an increase in this number, the disturbance in heat load resulting from the replacement of a spent portion of catalyst by a fresh portion becomes relatively smaller. However, a number within the range of three to six is usually adequate, and therefore such a number is preferred.

Many modifications and variations of this invention may obviously be used, and can be adapted by one skilled in the art without departing from the spirit of the disclosure. The restrictions used in the examples, and in connection with the drawing, need not necessarily be used as limits for all particular operations or sets of conditions, since they are presented primarily as illustrative examples. It will be understood that the flow diagram presented and described as a part of the disclosure is schematic only, and that many additional conventional pieces of equipment, such as pressure gauges, valves, pumps, heat exchangers, reflux lines and accumulators, heaters and coolers, and the like, will be necessary for any particular installation, and can be supplied to meet the requirements of any particular case by anyone skilled in the art. The essential equipment and conditions have been described and the modifications discussed in sufficient detail to serve as efficient guides. Although catalytic cracking and dehydrogenation operations are endothermic rather than exothermic, the fundamentals of my invention may be applied to such processes with success, with suitable allowances for known differences between exothermic and endothermic processes.

This application is a division of my copending application Serial Number 333,872, filed May 7, 1940.

I claim:

1. In combination, a plurality of catalytic reaction chambers, conduits for conducting a stream of reactants to each of said chambers, conduits for conducting a stream of hot reactants to each of said first named conduits, conduits for conducting a stream of relatively cooler reactants to each of said first named conduits, flow control means in each of said last named conduits, and temperature responsive means in each of said first named conduits operatively associated with said flow control means in the corresponding one of said last named conduits to vary the flow in each of the cool reactant conduits in response to temperature variations in the stream in the corresponding first named conduit.

2. A combination as defined in claim 1 in which means are provided for limiting the maximum flow rate in each of said first named conduits.

3. In an apparatus for conducting catalytic hydrocarbon conversions, in combination, a plurality of catalyst chambers arranged in parallel, conduit means for bringing a main stream of hydrocarbon to be connected into the system, juncture means for splitting said main stream into two substreams, single heating means for heating one of said substreams to at least the maximum temperature to be employed for the feed to any of said chambers, first conduit and manifold means for conveying said heated substream from said heating means towards said chambers, second conduit and manifold means for conveying the other substream from said juncture means towards said chambers in substantially unheated condition, a plurality of first conduits for conveying from said first manifold means towards said chambers a corresponding number of parallel heated streams, an equal number of second conduits for conveying from said second manifold means to juncture with said first conduits an equal number of parallel substantially unheated streams, third conduits for conveying the merged streams in parallel from said junctures into said chambers, valve means in said second conduits for controlling the flow of the streams therein, and means responsive to the temperatures of the respective merged streams in said third conduits for automatically controlling said valve means and thereby individually and independently controlling the temperatures of the respective merged streams fed to each of said chambers.

4. An apparatus as defined in claim 3 wherein said first conduits are unvalved and free from obstruction.

5. An apparatus as defined in claim 3 wherein said third conduits contain flow valves and means responsive to the rate of flow in said third conduits for controlling said valves.

6. An apparatus as defined in claim 3 wherein said third conduits are of such capacity that they thereby fix a limit on the flow therethrough into said chambers whereby no additional control is necessary and wherein said first and said third conduits form a straight conduit unvalved and free from obstruction.

7. An apparatus as defined in claim 3 wherein said manifold means supply sufficient material to meet the maximum flow limit of said third conduit means.

8. An apparatus as defined in claim 3 wherein means is provided for maintaining a positive pressure differential in said second manifold means over the pressure in said first manifold means for thereby insuring a positive flow through said second conduit means at all times when said valved means allows flow therethrough.

9. In an apparatus for conducting catalytic hydrocarbon conversions, in combination, a plurality of catalyst chambers arranged in parallel, conduit means for bringing a main stream of hydrocarbon to be connected into the system, juncture means for splitting said main stream into two substreams, single heating means for heating one of said substreams to at least the maximum temperature to be employed for the feed to any of said chambers, first conduit and manifold means for conveying said heated substream from said heating means towards said chambers, second conduit and manifold means for conveying the other substream from said juncture means towards said chambers in substantially unheated condition, a plurality of first conduits for conveying from said first manifold means towards said chambers a corresponding number of parallel heated streams, an equal number of second conduits for conveying from said second manifold means to juncture with said first conduits an equal number of parallel substantially unheated streams, third conduits for conveying the merged streams in parallel from said junctures into said chambers, fourth conduits for conveying the products from the catalytic chambers, valve means in said second conduits for controlling the flow of the streams therein, and primary means responsive to the temperatures of the merged streams in said third conduits and secondary means responsive to the temperatures of the product streams from the respective catalytic chambers, said primary and secondary temperature responsive means automatically and cooperatively controlling said valve means and thereby individually and independently controlling the temperatures of the respective merged streams fed to each of said chambers.

10. In combination, a plurality of catalytic reaction chambers, a charge conduit for each of said reaction chambers for conducting a stream of reactants to said chambers, a charge manifold for relatively hot reactants, a charge manifold for relatively cold reactants, unvalved branch conduits connecting said hot reactant manifold and each of said charge conduits, branch conduits connecting said cold reactant manifold and each of said charge conduits, flow control valves in each of said last-named branch conduits, a common charge conduit connecting through a juncture with conduits to both the aforesaid hot and cold reactant manifolds for conducting a common reactant to both said reactant manifolds, heating means on the conduit connecting the last-named common charge conduit with the hot reactant manifold for heating the reactant stream passing through said conduit to the hot reactant manifold, a discharge manifold, and a discharge conduit connecting each of said reaction chambers and said discharge manifold, wherein the flow-control valves in each of the branch conduits connecting the cold reactant manifold and the respective charge conduit are operatively associated with means responsive to temperatures of reactants entering the respective catalytic reaction chamber.

11. In combination, a plurality of catalytic reaction chambers, a charge conduit for each of said reaction chambers for conducting a stream of reactants to said chambers, a charge manifold for relatively hot reactants, a charge manifold for relatively cold reactants, unvalved branch conduits connecting said hot reactant manifold and each of said charge conduits, branch conduits connecting said cold reactant manifold and each of said charge conduits, flow control valves in each of said last-named branch conduits, a common charge conduit connecting through a juncture with conduits to both the aforesaid hot and cold reactant manifolds for conducting a common reactant to both said reactant manifolds, heating means on the conduit connecting the last-named common charge conduit with the hot reactant manifold for heating the reactant stream passing through said conduit to the hot reactant manifold, a discharge manifold, and a discharge conduit connecting each of said reaction chambers and said discharge manifold, wherein the flow-control valves in each of the branch conduits connecting the cold reactant manifold and the respective charge conduit are operatively associated with primary means responsive to temperature of reactants entering the respective catalytic reaction chamber and with secondary means responsive to changes of composition of the products leaving the respective catalytic reaction chamber.

12. In combination, a plurality of catalytic reaction chambers, a charge conduit for each of said reaction chambers for conducting a stream of reactants to said chambers, a charge manifold for relatively hot reactants, a charge manifold for relatively cold reactants, unvalved branch conduits connecting said hot reactant manifold and each of said charge conduits, branch conduits connecting said cold reactant manifold and each of said charge conduits, flow control valves in each of said last-named branch conduits, a common charge conduit connecting through a juncture with conduits to both the aforesaid hot and cold reactant manifolds for conducting a common reactant to both said reactant manifolds, heating means on the conduit connecting the last-named common charge conduit with the hot reactant manifold for heating the reactant stream passing through said conduit to the hot reactant manifold, a discharge manifold, and a discharge conduit connecting each of said reaction chambers and said discharge manifold, wherein the flow-control valves in each of the branch conduits connecting the cold reactant manifold and the respective charge conduit are operatively associated with primary means responsive to temperature of reactants entering the respective catalytic reaction chamber and secondary means responsive to temperature of the products leaving the catalytic reaction chamber.

KARL H. HACHMUTH.